Aug. 15, 1967 J. O. TEMPLETON Re. 26,246

DISPOSABLE CUSPIDOR EVACUATED BY SUCTION

Original Filed Feb. 18, 1963

INVENTOR.
J. O. Templeton.

United States Patent Office

Re. 26,246
Reissued Aug. 15, 1967

26,246
DISPOSABLE CUSPIDOR EVACUATED BY SUCTION

James O. Templeton, 215 S. Jefferson St., Winchester, Tenn. 37398

Original No. 3,155,990, dated Nov. 10, 1964, Ser. No. 259,003, Feb. 18, 1963. Application for reissue Nov. 4, 1966, Ser. No. 596,042
3 Claims. (Cl. 4—258)

Matter enclosed in heavy brackets [ ] appears in the original patent but forms no part of this reissue specification; matter printed in italics indicates the additions made by reissue.

This invention relates to a dental or surgeon's device and more specifically to a hand-held disposable cuspidor having a suction drain for use by dental or surgery patients.

It is an object of the present invention to provide a disposable, sanitary device which can be held in the hand and expectorated into while the patient is seated in a semi-reclined position. The device is small, light in weight and so designed as to be held in the hand by the patient, and to be used by him as necessary without arising.

Another object of the present invention is to provide a cuspidor that is attractive in appearance, neat and clean.

Still further object of the present invention is to provide a cuspidor which can be constructed of paper, plastic or similar material, produced, packaged and sold in large quantities at a comparatively low cost, and which can be conveniently utilized in surgical and dental operations.

Still additional objects, benefits, and advantages of this invention will become evident fro ma study of the following detailed description, taken in conjunction with the accompanying drawing, in which.

Figure 1:
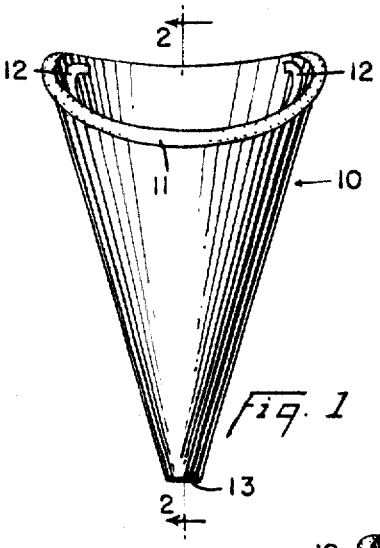
FIGURE 1 is a front elevational view of the disposable portion of the vacuum cuspidor, as it appears separated from its holder.
Figure 2:
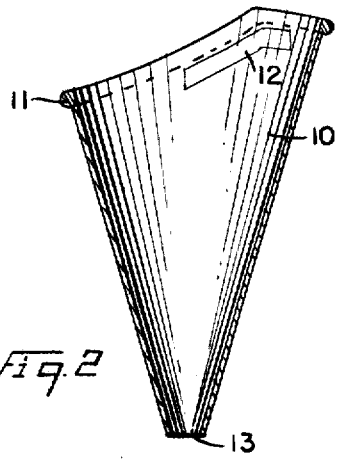
FIGURE 2 is a cross sectional view of the receptacle taken along the line 2—2 of FIGURE 1, showing the interior of the disposable receptacle.
Figure 3:
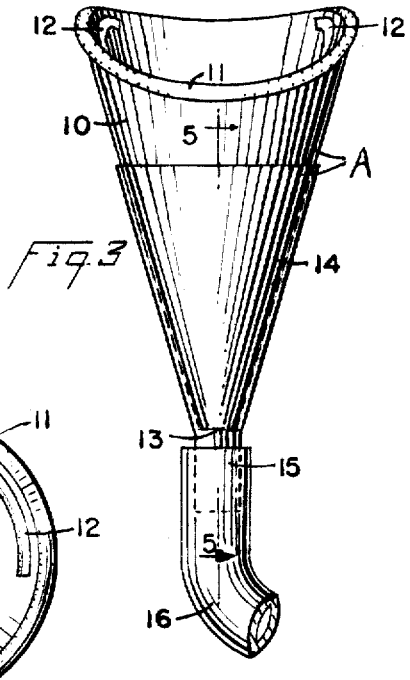
FIGURE 3 is an assembled elevational view of the disposable vacuum cuspidor made in accordance with the present invention.
Figure 4:
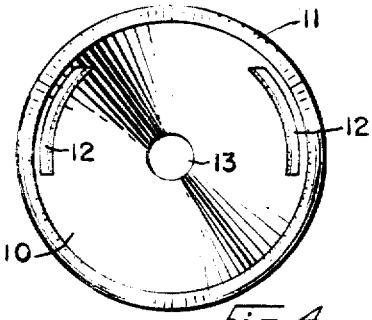
FIGURE 4 is a top plan of the disposable vacuum receptacle, showing drain opening vents and contour.
Figure 5:
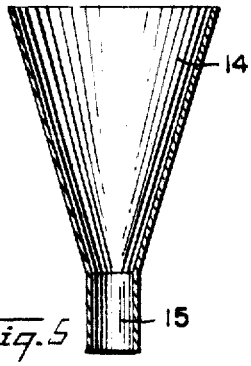
FIGURE 5 is a cross sectional view of the funnel, taken along the line 5—5 of FIGURE 3, showing the interior design of the funnel and nipple.

Referring now specifically to the drawing, a disposable vacuum cuspidor A made in accordance with the present invention is shown to include a hollow, disposable, generally funnel-shaped receptacle 10. A funnel 14, to be more or less permanent, is designed with the same taper as the disposable receptacle 10. This funnel 14 is the receiver and holder of the disposable receptacle 10 while in actual use. The disposable receptacle 10 is held in place by friction due to the long tapered design of the funnel 14, and by reduced air pressure in the cuspidor A. The disposable receptacle 10 is easily removed from its holder after use and discarded. The funnel 14 converges into a straight nipple 15, which is connected to a continuous vacuum source, not shown, by means of a flexible suction hose 16.

The disposable receptacle 10 is preferably constructed of paper, plastic or similar material. The top border or edge 11 is contoured to fit the patient's face when held in proper contact with the face. This border is rolled, smooth and so designed as to be comfortable against the face. The oblong openings 12 in each side are vents. The bottom 13 of the receptacle 10 is tapered so as to fit snugly within the nipple 15 of the funnel 14. There is a lowered air pressure in the suction hose 16, and in the receptacle 10, causing air to be drawn into the vents 12. This equalizes the air pressure in the receptacle 10, and also prevents the receptacle from adhering to the patient's face while in use.

The funnel 14 may be constructed of any of several materials of permanent nature, preferably stainless steel. The lower end of the funnel 15 is so designed with a straight nipple as to lessen air resistance and noise, and also to hold the flexible suction hose 16 without being dislodged.

A lightweight flexible suction hose 16 is used to connect with the vacuum source. This makes the cuspidor A readily maneuverable into any position the patient might want to assume.

The operation of this device will now be readily understood as each new patient is seated in the dentist's chair, a fresh receptacle 10 is placed in the funnel 14.

The semi-reclined patient, holding the cuspidor A in his hand, has only to incline his head slightly forward and at the same time to engage the contoured edge 11 of the cuspidor A in proper contact against his face, to expectorate any undesired liquid or debris from the mouth.

The reduced air pressure in the suction hose 16 and in the receptacle 10 causes inrushing of air through the vents 12, whereby this causes liquid and debris that are expectorated from the mouth into the receptacle 10 to be evacuated inwardly and downwardly to the drain openings 13, 15 and out the suction hose 16, which is connected to a continuous vacuum source for evacuation.

While this invention has been described with particular reference to the construction shown in the drawing, and while various changes may be made in the detailed construction, it shall be understood that such changes shall be within the spirit and scope of the present invention as defined by the appended claims.

Having thus completely and fully described the invention, what is now claimed as new and desired to be protected by Letters Patent of the United States is:

*1.* A cuspidor comprising
- a rigid frusto-conical funnel having a nipple at its lower end,
- a flexible hose for connecting the nipple of the funnel to a source of suction and
- a disposable receptacle,
  - the receptacle being frusto-conical and fitting snugly within the funnel,
  - having an opening at its lower end in registry with the nipple of the funnel,
  - extending substantially above the upper end of the funnel,
  - having a rolled upper edge so contoured as to fit the face of a person and
  - having adjacent its upper edge and above the funnel at least one vent opening, whereby waste matter expectorated by a person is evacuated by suction through the receptacle, funnel and hose.

*2. A cuspidor comprising*
- *a hollow, generally funnel-shaped member having a nipple at its lower end,*
- *a flexible hose for connecting the nipple of the member to a source of suction and*
- *a disposable receptacle,*
  - *the receptacle being generally funnel-shaped and fitting snugly within the member,*
  - *extending above the upper end of the member,*
  - *having an opening adjacent its lower end communicating with the nipple of the member,*
  - *having a rolled upper edge so contoured as to fit the face of a person and*

*having adjacent its upper edge at least one vent opening,*

*whereby waste matter expectorated by a person is evacuated by suction through the receptacle, member and hose.*

*3. A cuspidor adapted when in use to engage the face in encircling relationship to the mouth of a person seated in a semi-reclined position, the cuspidor comprising*

*a hollow, downwardly-tapered holder having an open upper end and a drain opening adjacent its lower end,*

*a flexible hose for connecting the drain opening of said holder to a source of suction and*

*a disposable receptacle having an open upper end,*

*the receptacle being hollow and downwardly-tapered and fitting within the holder,*

*having an opening adjacent its lower end in registry with the drain opening of the holder,*

*extending above the upper end of the holder,*

*having a smooth upper edge so contoured as to fit the face of a person and*

*having at least one vent opening communicating with the atmosphere for admitting air therefrom into the receptacle,*

*whereby waste matter expectorated by a person is evacuated by suction through the receptacle, holder and hose.*

References Cited

The following references, cited by the Examiner, are of record in the patented file of this patent or the original patent.

UNITED STATES PATENTS

| | | | |
|---|---|---|---|
| 935,508 | 9/1909 | Hill | 4—283 |
| 1,110,967 | 9/1914 | Silveira | 4—285 |
| 1,253,555 | 1/1918 | Wolf | 4—263 |
| 1,381,619 | 6/1921 | Curtin | 248—152 |

LAVERNE D. GEIGER, *Primary Examiner.*

H. J. GROSS, *Assistant Examiner.*